(12) United States Patent
Horng (10) Patent No.: US 9,197,723 B1
(45) Date of Patent: Nov. 24, 2015

(54) FLIP-UP ELECTRONIC PRODUCT MOUNTING STRUCTURE

(71) Applicant: Chin-Hsing Horng, Taoyuan (TW)

(72) Inventor: Chin-Hsing Horng, Taoyuan (TW)

( * ) Notice: Subject to any disclaimer, the term of this patent is extended or adjusted under 35 U.S.C. 154(b) by 0 days.

(21) Appl. No.: 14/509,040

(22) Filed: Oct. 7, 2014

(51) Int. Cl.
*E05D 3/12* (2006.01)
*H04M 1/02* (2006.01)

(52) U.S. Cl.
CPC .................................. *H04M 1/0216* (2013.01)

(58) Field of Classification Search
CPC H04M 1/0214; H04M 1/0216; H04M 1/0245
See application file for complete search history.

(56) References Cited

U.S. PATENT DOCUMENTS

| 9,057,215 | B1* | 6/2015 | Horng | E05D 3/06 |
| 9,103,147 | B1* | 8/2015 | Chuang | E05D 5/121 |
| 9,104,382 | B2* | 8/2015 | Chen | G06F 1/1681 |
| 2015/0040353 | A1* | 2/2015 | Chen | G06F 1/1681 16/366 |

\* cited by examiner

*Primary Examiner* — Bobbak Safaipour (57) ABSTRACT

A flip-up electronic product mounting structure includes a base frame shell having a pivot connection portion, a cover frame shell having a mating connection portion and a plug hole located in the mating connection portion, and a hinge including female hinge members fixedly mounted in the pivot connection portion, a male hinge member rotatably and axially movably mounted in the female hinge member with a plug portion located at one end thereof, and a displacement control device operable to move the male hinge member relative to the female hinge member to further engage the plug portion into the plug hole or disengage the plug portion from the plug hole. Thus, the invention facilitates the assembly of the flip-flop electronic product, enabling the flip-flop electronic product to have light, thin, short and small design characteristics.

3 Claims, 10 Drawing Sheets

FLIP-UP ELECTRONIC PRODUCT MOUNTING STRUCTURE

BACKGROUND OF THE INVENTION

1. Field of the Invention

The present invention relates to flip-up electronic product technology and more particularly, to a flip-up electronic product mounting structure which uses a specially designed hinge to couple a base frame shell and a cover frame shell together.

2. Description of the Related Art

Hinges are intensively used in flip-up mobile electronic devices, such as notebook, electronic dictionary, PDA and etc. to pivotally connect a base member and a cover member together, allowing only a limited angle of rotation between them.

A conventional flip-up electronic product mounting structure for flip-up electronic product generally comprises a female hinge shaft having a mounting leaf for fixation to a cover member of a flip-up electronic product, and a male hinge shaft rotatably inserted through the female hinge shaft and having a mounting leaf for fixation to a base member of the flip-up electronic product for allowing the cover member of the flip-up electronic product to be turned relative to the base member between an open position and a close position. However, this conventional design of flip-up electronic product mounting structure still has drawbacks as follows:

1. The cover member and base member of the flip-up electronic product must provide a respective mounting leaf for mounting. It is complicated to respectively fasten the mounting leaf of the male hinge shaft and the mounting leaf of the female hinge shaft to the cover member and base member of the flip-up electronic product with screws.

2. Today's electronic products are facing light, thin, short and small design. The mounting leaf of the male hinge shaft and the mounting leaf of the female hinge shaft occupy much space in the cover member and base member of the flip-up electronic product, minimizing available internal space of the flip-up electronic product, not facilitating small size design.

SUMMARY OF THE INVENTION

The present invention has been accomplished under the circumstances in view. It is therefore the main object of the present invention to provide a flip-up electronic product mounting structure, which facilitates the assembly of the flip-flop electronic product, enabling the flip-flop electronic product to have light, thin, short and small design characteristics.

To achieve this and other objects of the present invention, a flip-up electronic product mounting structure comprises a base frame shell, a cover frame shell, and a hinge. The base frame shell comprises a pivot connection portion. The cover frame shell comprises a mating connection portion, and a plug hole located in the mating connection portion. The hinge is mounted in the pivot connection portion of the base frame shell for detachably and pivotally securing the cover frame shell to the base frame shell, comprising at least one female hinge member affixed to the base frame shell, a male hinge member rotatably and axially movably mounted in the at least one female hinge member, the male hinge member comprising a non-circular plug portion located at one end thereof in axial alignment with the plug hole of the cover frame shell for engaging into the plug hole of the cover frame shell, and displacement control means operable to move the male hinge member between a first position where the plug portion is engaged into the plug hole to pivotally secure the cover frame shell to the base frame shell, and a second position where the plug portion is disengaged from the plug hole for allowing separation between the cover frame shell and the base frame shell.

DETAILED DESCRIPTION OF THE PREFERRED EMBODIMENT

Figure 1:
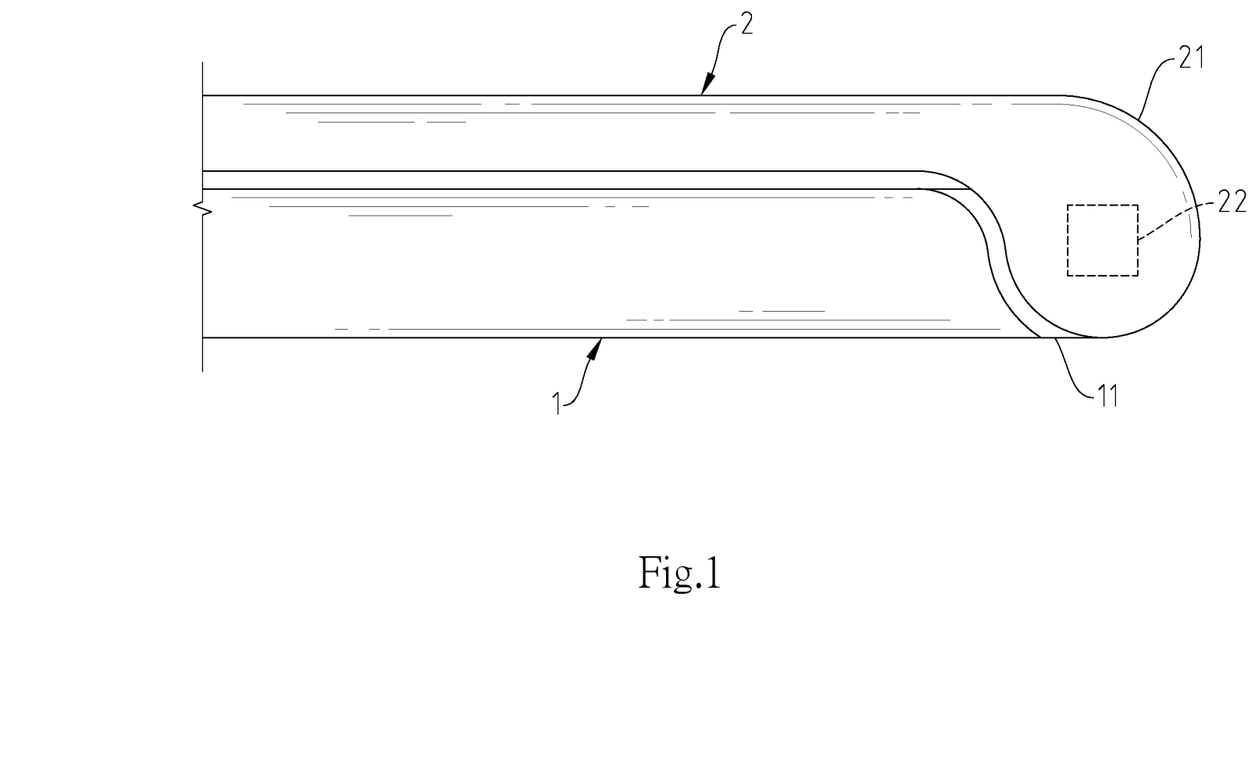
FIG. 1 is a schematic side view of a flip-up electronic product mounting structure in accordance with a first embodiment of the present invention.
Figure 5:
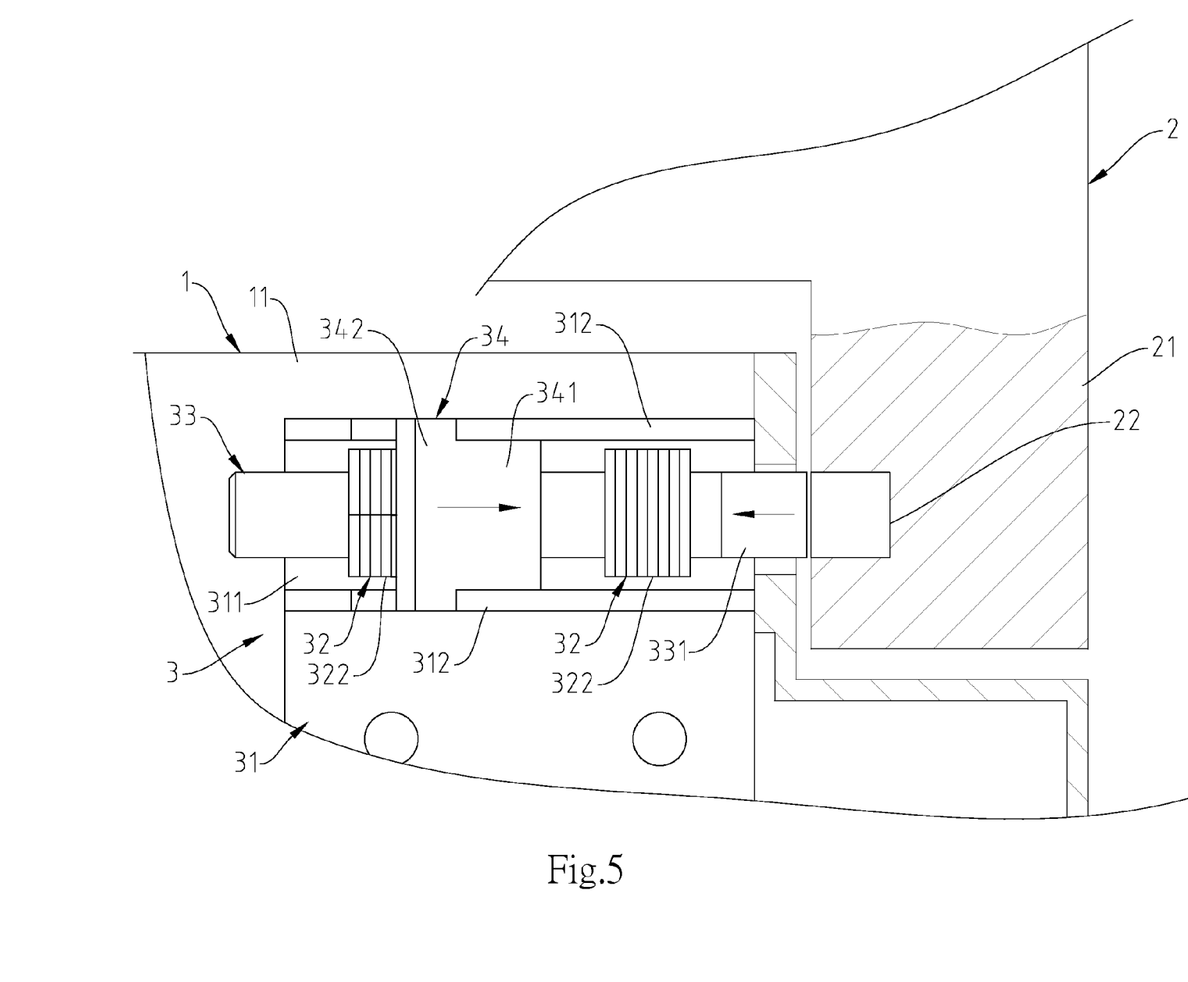
FIG. 5 is a schematic assembly view of the flip-up electronic product mounting structure in accordance with the first embodiment of the present invention (I).

Referring to FIGS. 1 and 5, a flip-up electronic product mounting structure in accordance with a first embodiment of the present invention is shown. The flip-up electronic product mounting structure comprises a base frame shell 1 with a pivot connection portion 11 located at one side thereof and a non-circular plug hole 22 located in the pivot connection portion 11 holding therein, for example, a keyboard, a circuit board and etc. and having, a cover frame shell 2 with a mating connection portion 21 located at one side thereof and holding therein, for example, a display screen, a hinge 3 mounted in the pivot connection portion 11 of the base frame shell 1.

Figure 2:
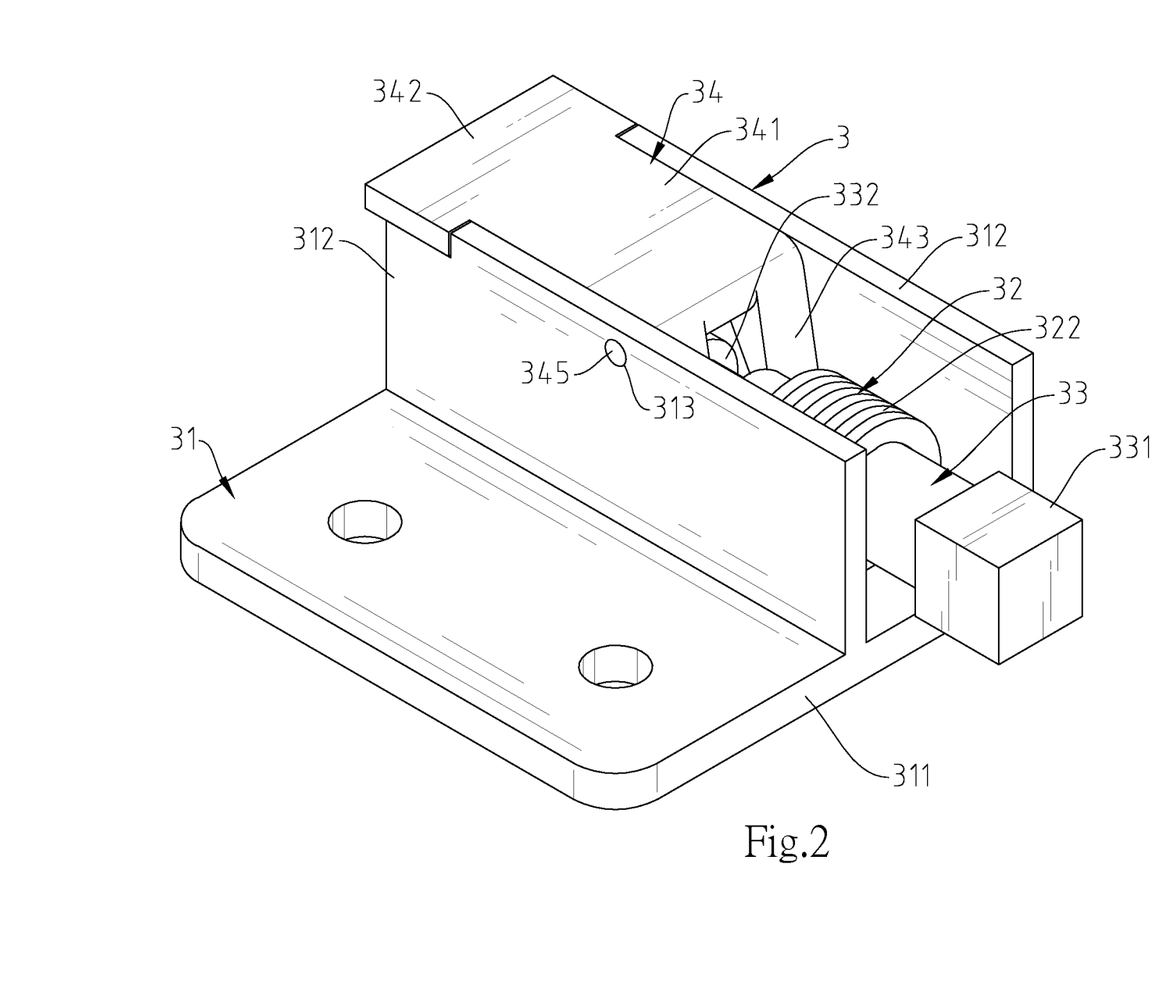
FIG. 2 is an oblique top elevational view of the hinge of the flip-up electronic product mounting structure in accordance with the first embodiment of the present invention.
Figure 3:
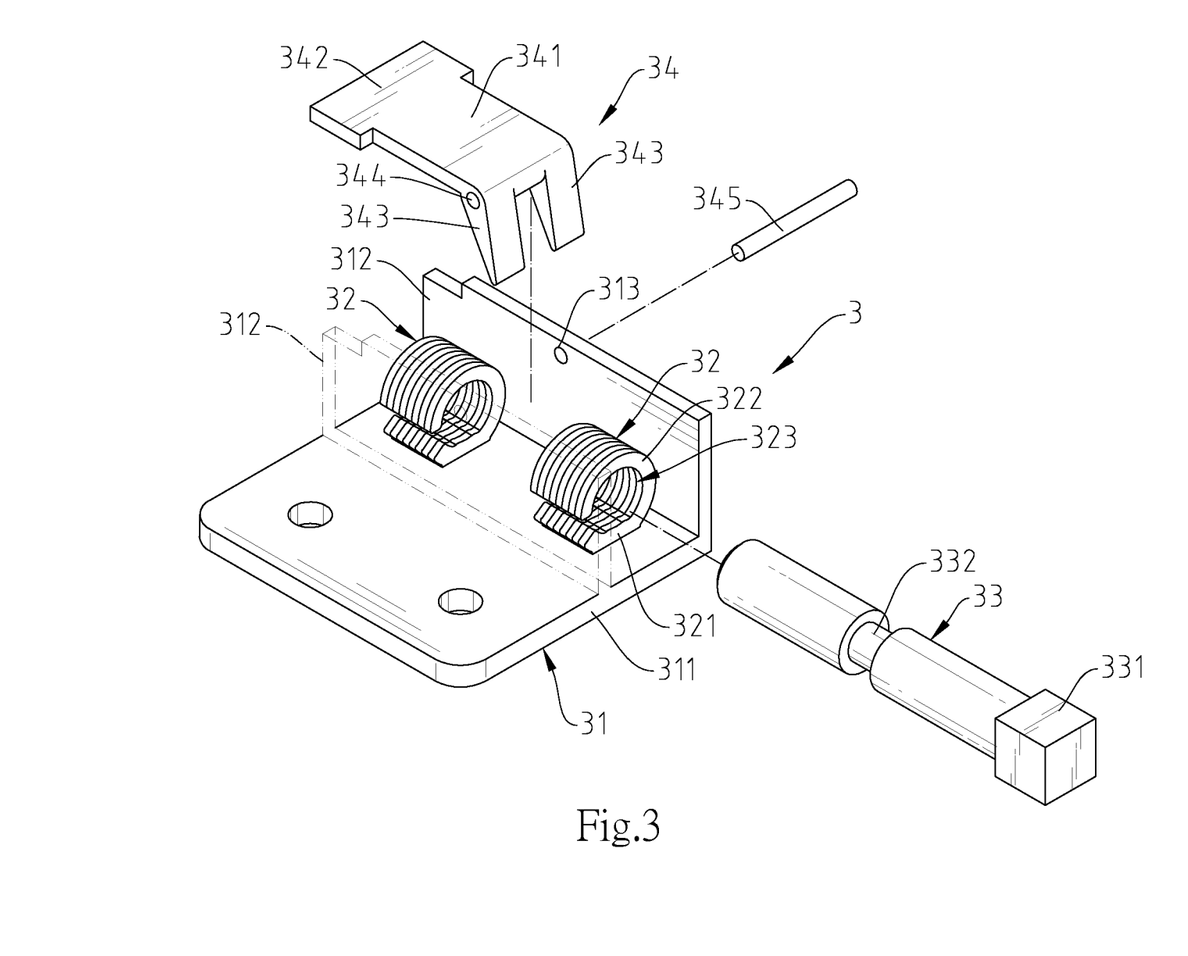
FIG. 3 is an exploded view of the hinge of the flip-up electronic product mounting structure in accordance with the first embodiment of the present invention.
Figure 4:
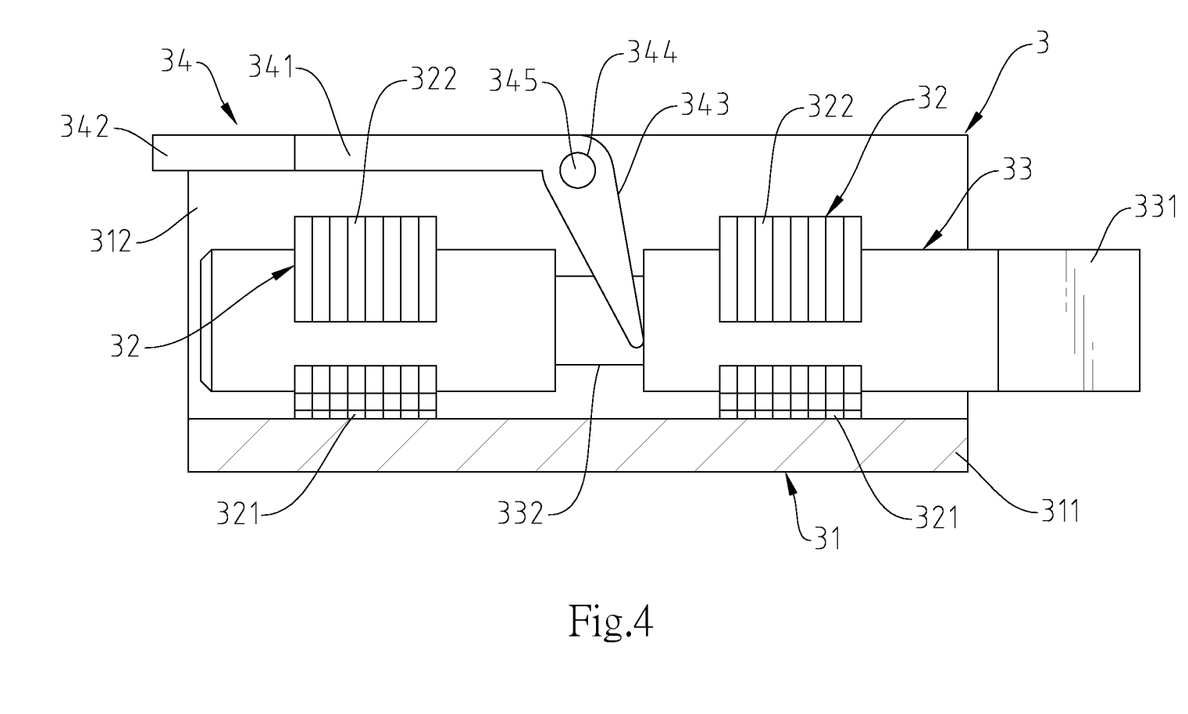
FIG. 4 is a sectional view of the hinge of the flip-up electronic product mounting structure in accordance with the first embodiment of the present invention.

Referring to FIGS. 2-4 and FIG. 5 again, the hinge 3 comprises a mounting base member 31, two female hinge members 32, a male hinge member 33, and first displacement control means. In this embodiment, the first displacement control means is a lever 34.

The mounting base member 31 is fixedly mounted at the pivot connection portion 11 of the base frame shell 1, comprising a horizontal bottom wall 311, two upright walls 312 vertically upwardly extended from the horizontal bottom wall 311 in a parallel manner, and a mounting hole 313 located in each upright wall 312.

The female hinge members 32 are fixedly mounted at a top surface of the horizontal bottom wall 311 of the mounting base member 31 between the two upright walls 312, each comprising a split tube-like shaft body 322 defining therein an axially extending shaft chamber 323, and a positioning portion 321 formed integral with the periphery of the split tube-like shaft body 322 and fixedly mounted at the top surface of the horizontal bottom wall 311 of the mounting base member 31.

The male hinge member 33 is rotatably and axially movably inserted through the axially extending shaft chamber 323 of each female hinge member 32, comprising a non-circular plug portion 331 located at one end thereof and a position-limit groove 332 extending around the periphery thereof on the middle and disposed between the two female hinge members 32.

The lever 34 comprises a lever body 341 and a pivot pin 345. The lever body 341 comprises an operating portion 342, two actuation portions 343 bilaterally extended from one end of the operating portion 342, and a pivot hole 344 transversely cut through two opposite lateral sides thereof between the operating portion 342 and the actuation portion 343. The pivot pin 345 is inserted through the pivot hole 344 and respectively fixedly connected with two opposite ends thereof to the mounting hole 313 of the mounting base member 31, enabling the actuation portions 343 to be positioned in the position-limit groove 332 and disposed at two opposite lateral sides of the male hinge member 33.

Figure 6:
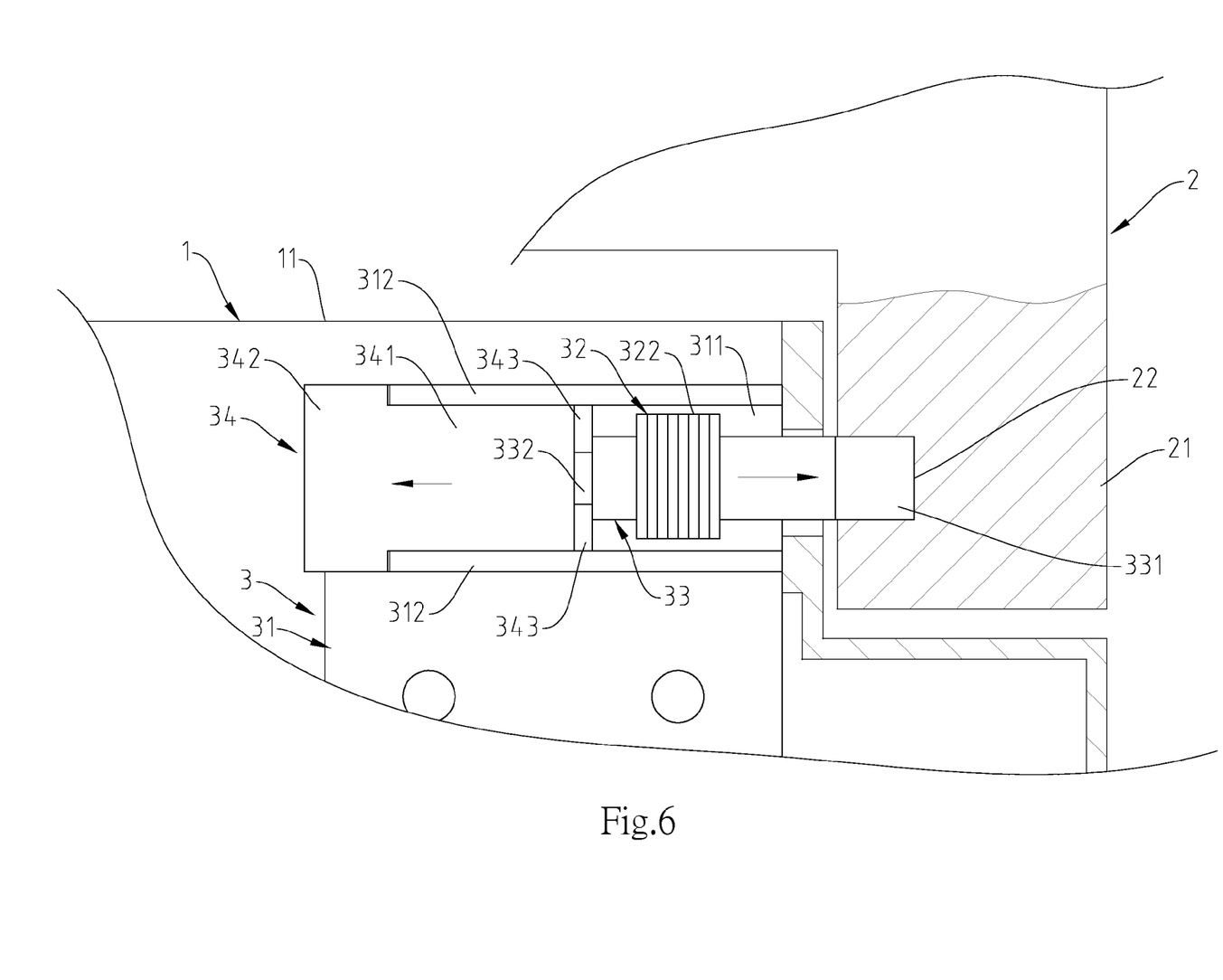
FIG. 6 is a schematic assembly view of the flip-up electronic product mounting structure in accordance with the first embodiment of the present invention (II).

Referring to FIG. 6 and FIGS. 2-5 again, when mounting the base frame shell 11 and the cover frame shell 2, bias the operating portion 342 of the lever 34 in an upward direction away from the upright wall 312 of the mounting base member 31 to drive the actuation portions 343 in moving the male hinge member 33 toward the mounting base member 31, then approach the pivot connection portion 11 of the base frame shell 1 to the mating connection portion 21 of the cover frame shell 2 to keep the non-circular plug hole 22 of the cover frame shell 2 in axial alignment with the plug portion 331 of the male hinge member 33. At this time, the user can bias the operating portion 342 of the lever 34 in direction toward the upright walls 312 of the mounting base member 31 to push the actuation portion 343 against the male hinge member 33 in direction away from the mounting base member 3, forcing the plug portion 331 of the male hinge member 33 into the non-circular plug hole 22 of the cover frame shell 2. Because the plug portion 331 of the male hinge member 33 and the non-circular plug hole 22 of the cover frame shell 2 are non-circular and mates with each other, the cover frame shell 2 is pivotally coupled to the cover frame shell 2 by the male hinge member 33 after the plug portion 331 is engaged into the non-circular plug hole 22 of the cover frame shell 2. Similarly, when the user wishes to dismount the cover frame shell 2 and the base frame shell 1, bias the operating portion 342 of the lever 34 in direction away from the upright walls 312 of the mounting base member 31 to force the actuation portions 343 in moving the male hinge member 33 toward the mounting base member 31 and to further disengage the plug portion 331 of the male hinge member 33 from the non-circular plug hole 22 of the cover frame shell 2, allowing separation between the base frame shell 11 and the cover frame shell 2.

Referring to FIGS. 7-10 and FIG. 1 again, a flip-up electronic product mounting structure in accordance with a second embodiment of the present invention is shown. This second embodiment is substantially similar to the aforesaid first embodiment with exception of the design of the hinge. According to this second embodiment, the hinge, referenced by 4, comprises a mounting base member 41, two female hinge members 42, a male hinge member 43, and second displacement control means. In this embodiment, the second displacement control means is a rotary knob 44.

Figure 7:
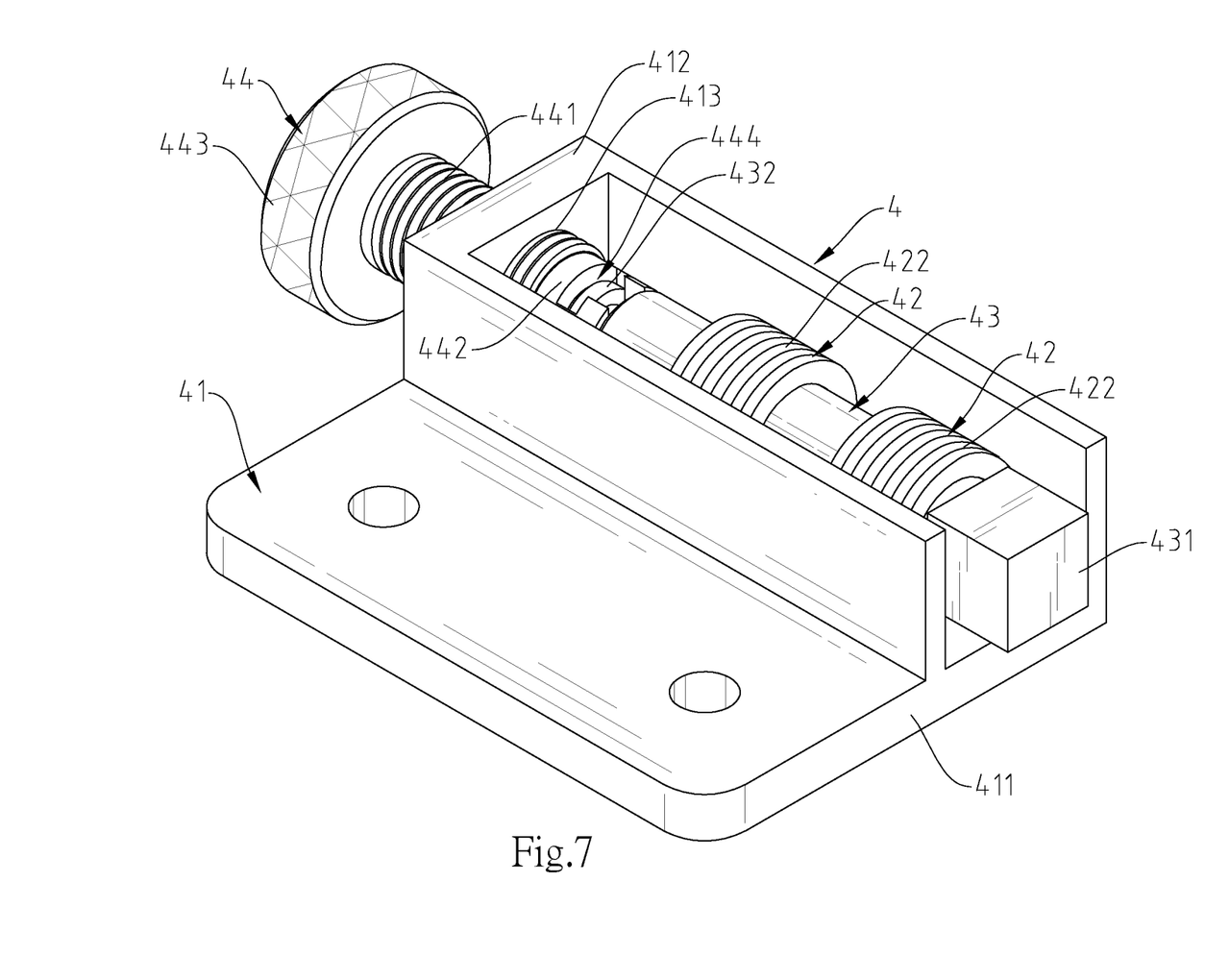
FIG. 7 is an oblique top elevational view of a hinge for flip-up electronic product mounting structure in accordance with a second embodiment of the present invention.
Figure 8:
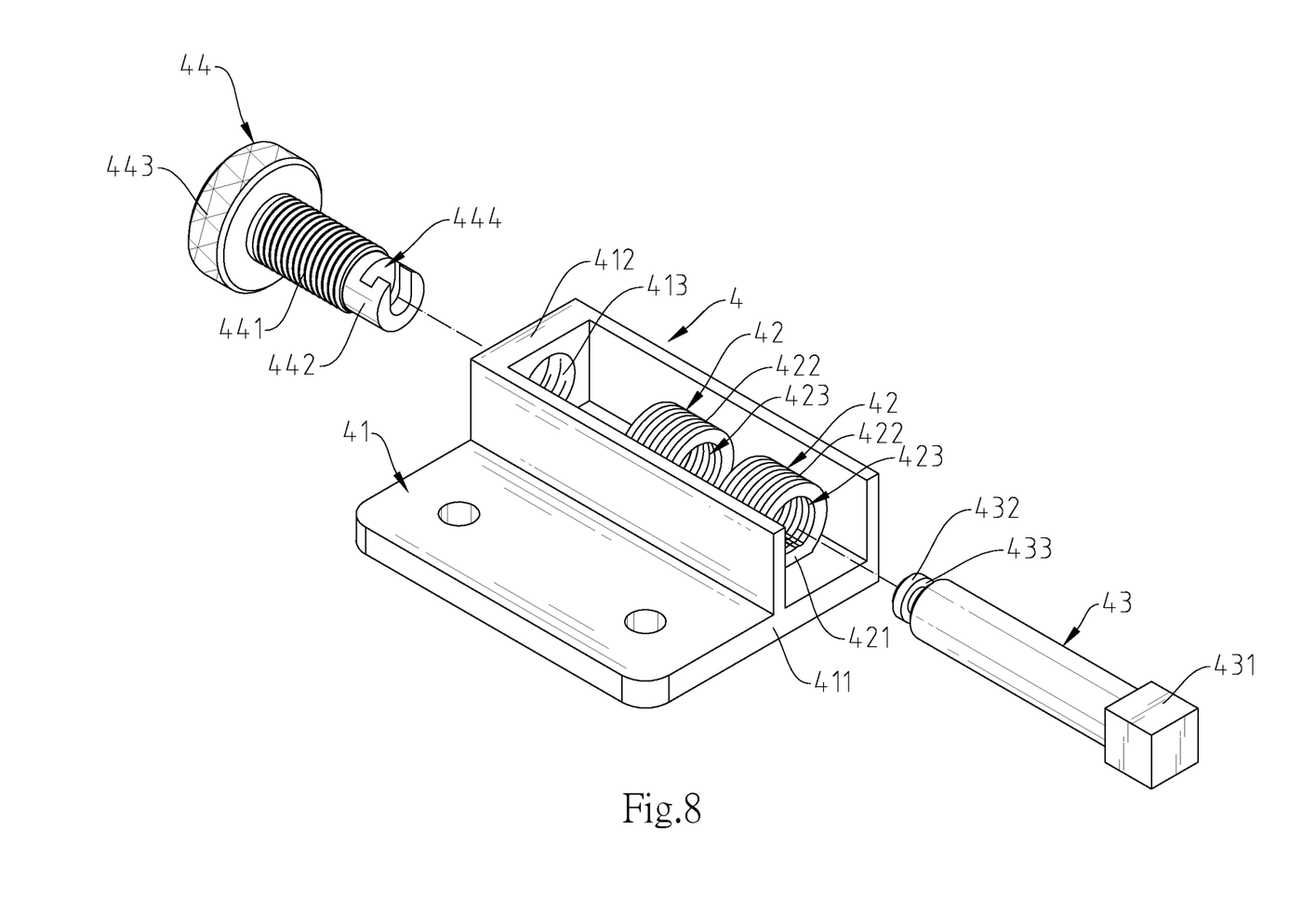
FIG. 8 is an exploded view of the hinge shown in FIG. 7.

The mounting base member 41 is fixedly mounted at the pivot connection portion 11 of the base frame shell 11, comprising a horizontal bottom wall 411, an upright wall 412 vertically upwardly extended from the horizontal bottom wall 411, and a screw hole 413 located in the upright wall 412.

The female hinge members 42 are fixedly mounted at a top surface of the horizontal bottom wall 411 of the mounting base member 41 and axially spaced from each other at a predetermined distance, each comprising a split tube-like shaft body 422 defining therein an axially extending shaft chamber 423, and a positioning portion 421 formed integral with the periphery of the split tube-like shaft body 422 and fixedly mounted at the top surface of the horizontal bottom wall 411 of the mounting base member 41.

The male hinge member 43 is rotatably and axially movably inserted through the axially extending shaft chamber 423 of each female hinge member 42, comprising a plug portion 431 located at one end thereof, a connection portion 432 located at an opposite end of the cylindrical shaft body 431 and disposed adjacent to one end of the upright wall 412, and a position-limit groove 433 extending around the periphery of the connection portion 432 and suspending in the upright wall 412 between the screw hole 413 and the female hinge members 42.

The rotary knob 44 comprises a threaded shank 41 threaded into the screw hole 413 of the mounting base member 41, an actuation portion 442 located at one end of the threaded shank 441, an operating head 443 located at an opposite end of the threaded shank 441 and coupled to the connection portion 432 of the male hinge shaft 43, a receiving trough 444 defined in the actuation portion 442 and adapted for receiving the connection portion 432 of the male hinge shaft 43.

Figure 9:
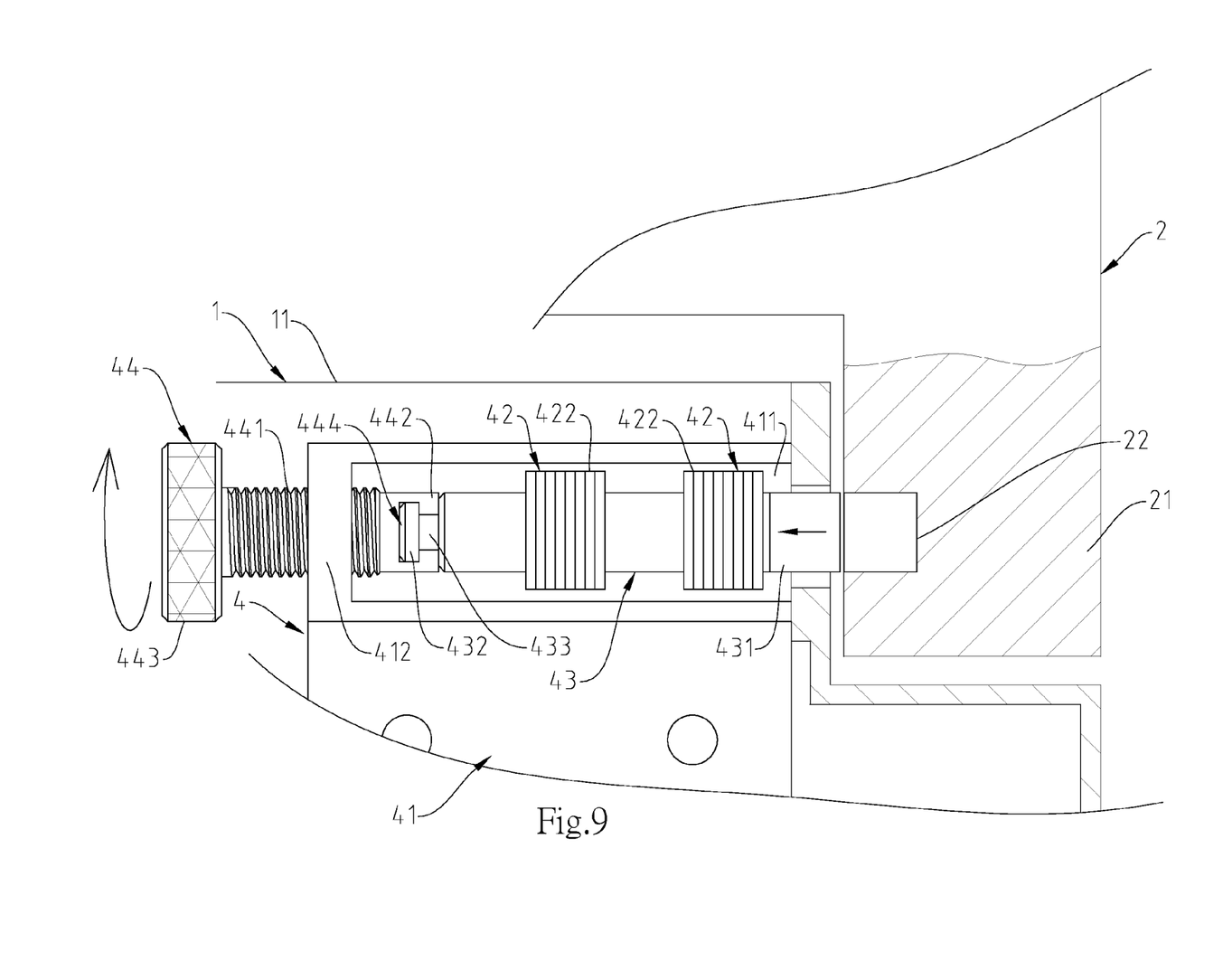
FIG. 9 is a schematic assembly view of the flip-up electronic product mounting structure in accordance with the second embodiment of the present invention (I).
Figure 10:
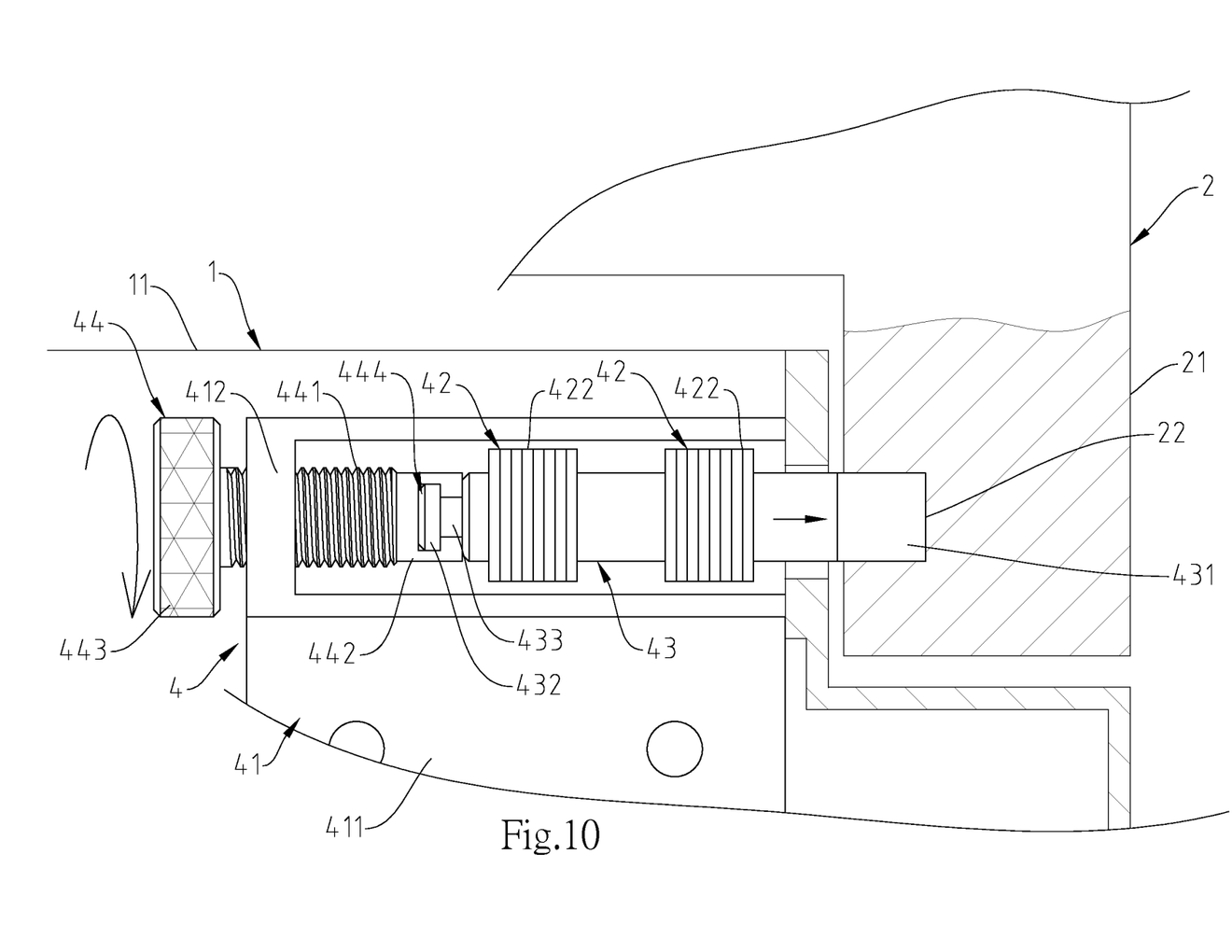
FIG. 10 is a schematic assembly view of the flip-up electronic product mounting structure in accordance with the second embodiment of the present invention (II).

When mounting the base frame shell 1 and the cover frame shell 2, operate the operating head 443 of the rotary knob 44 to rotate the threaded shank 441 and to further move the threaded shank 441 in direction away from the mounting base member 41, causing the actuation portion 442 of the rotary knob 44 to carry the connection portion 432 of the male hinge member 43 in direction toward the mounting base member 41, and thus, the plug portion 431 of the male hinge member 43 is moved in direction toward the mounting base member 41. Thereafter, approach the pivot connection portion 11 of the base frame shell 1 to the mating connection portion 21 of the cover frame shell 2 to keep the non-circular plug hole 22 of the cover frame shell 2 in axial alignment with the plug portion 431 of the male hinge member 43. At this time, the user can operate the operating head 443 to rotate rotary knob 44 and to simultaneously move the threaded shank 441 in direction toward the female hinge members 42, causing the male hinge member 43 to be driven by the rotary knob 44 to carry the plug portion 431 in direction away from the mounting base member 41 and then into the non-circular plug hole 22 of the cover frame shell 2. Because the plug portion 431 of the male hinge member 43 and the non-circular plug hole 22 of the cover frame shell 2 are non circular and mating with each other, the user can turn the cover frame shell 2 about the make hinge member 43 after the plug portion 43 is engaged into the non-circular plug hole 22. Similarly, if the user wishes to separate the base frame shell 11 and the cover frame shell 2, operate the operating head 443 of the rotary knob 44 to move the rotary knob 44 in direction away from the mounting base member 41, causing the connection portion 432 of the male hinge member 43 to be carried by the actuation portion 442 of the rotary knob 44 in direction toward the mounting base member 41, and the plug portion 431 will then be disengaged from the non-circular plug hole 22, allowing separation between the cover frame shell 2 and the base frame shell 1.

What the invention claimed is:

1. A flip-up electronic product mounting structure, comprising:
   a base frame shell comprising a pivot connection portion;
   a cover frame shell comprising a mating connection portion and a plug hole located in said mating connection portion; and
   a hinge mounted in said pivot connection portion of said base frame shell for detachably and pivotally securing said cover frame shell to said base frame shell, said hinge comprising at least one female hinge member affixed to said base frame shell, a male hinge member rotatably and axially movably mounted in said at least one female hinge member, said male hinge member comprising a non-circular plug portion located at one end thereof in axial alignment with said plug hole of said cover frame shell for engaging into said plug hole of said cover frame shell, and displacement control means operable to move said male hinge member between a first position where said plug portion is engaged into said plug hole to pivotally secure said cover frame shell to said base frame shell, and a second position where said plug portion is disengaged from said plug hole for allowing separation between said cover frame shell and said base frame shell.

2. The flip-up electronic product mounting structure as claimed in claim 1, wherein said plug portion of said male hinge member of said hinge and said plug hole of said cover frame shell are non circular and mating with each other.

3. The flip-up electronic product mounting structure as claimed in claim 1, wherein said hinge further comprises a mounting base member fixedly mounted in said pivot connection portion of said base frame shell; said at least one female hinge member is fixedly mounted in said mounting base member; said male hinge member is inserted through said at least one female hinge member with said plug portion exposed to the outside of said at least one female hinge member.

* * * * *